(12) United States Patent
Dinter et al.

(10) Patent No.: US 8,128,525 B2
(45) Date of Patent: Mar. 6, 2012

(54) EPICYCLIC GEARBOX FOR A WIND POWER INSTALLATION

(75) Inventors: Ralf Martin Dinter, Gelsenkirchen (DE); Manfred Möllers, Bocholt (DE); Herbert Scheibe, Bocholt (DE)

(73) Assignee: Winergy AG, Voerde (DE)

( * ) Notice: Subject to any disclaimer, the term of this patent is extended or adjusted under 35 U.S.C. 154(b) by 258 days.

(21) Appl. No.: 12/641,870

(22) Filed: Dec. 18, 2009

(65) Prior Publication Data

US 2010/0160104 A1   Jun. 24, 2010

(30) Foreign Application Priority Data

Dec. 19, 2008  (DE) .......................... 10 2008 063 868

(51) Int. Cl.
*F16H 57/04* (2010.01)
*F16H 57/08* (2006.01)
(52) U.S. Cl. ....................................... 475/159; 475/348
(58) Field of Classification Search .................. 475/159, 475/348
See application file for complete search history.

(56) References Cited

U.S. PATENT DOCUMENTS

| 3,821,908 | A | 7/1974 | Marsch et al. | |
| 2010/0007151 | A1* | 1/2010 | Ciszak et al. | 290/55 |
| 2010/0056315 | A1* | 3/2010 | Scholte-Wassink | 475/159 |
| 2010/0086403 | A1* | 4/2010 | McCune | 415/229 |

FOREIGN PATENT DOCUMENTS

| DE | 19916454 A1 | 10/2000 |
| DE | 10260132 A1 | 7/2004 |
| DE | 10302192 A1 | 9/2004 |
| DE | 102006046487 A1 | 4/2007 |
| EP | 1184567 A2 | 3/2002 |
| EP | 1703174 A1 | 9/2006 |
| WO | WO 0144695 A1 | 6/2001 |

* cited by examiner

*Primary Examiner* — Edwin A Young
(74) *Attorney, Agent, or Firm* — Henry M. Feiereisen; Ursula B. Day

(57) ABSTRACT

A first planet stage of an epicyclic gearbox revolves in a gearbox housing and includes a planet support having two interconnected side pieces. Planet gears are borne in the planet support via planet gear bearings and engage a central sun gear shaft and a hollow gear secured to the gearbox housing. A first channel has one end connected to an oil supply in communication with an oil feed pump and passes through a gearbox housing wall, and another end connected via second channels, passing through one side piece of the planet support, to third and fourth channels, passing through the shafts of the planet gears and open to the planet gear bearings. The first channel passes through an insertion apparatus secured in the gearbox housing and. The first planet stage is complemented by a second planet stage with a second planet support, second planet gears and a second sun gear shaft, with the insertion apparatus including a radial stator with an axial bush arranged radially between the first and second planet supports.

5 Claims, 2 Drawing Sheets

EPICYCLIC GEARBOX FOR A WIND POWER INSTALLATION

CROSS-REFERENCES TO RELATED APPLICATIONS

This application claims the priority of German Patent Application, Serial No. 10 2008 063 868.4, filed Dec. 19, 2008, pursuant to 35 U.S.C. 119(a)-(d), the content of which is incorporated herein by reference in its entirety as if fully set forth herein.

BACKGROUND OF THE INVENTION

The present invention relates to an epicyclic gearbox for a wind power installation which is provided with a rotor.

The following discussion of related art is provided to assist the reader in understanding the advantages of the invention, and is not to be construed as an admission that this related art is prior art to this invention.

German patent document DE 102 60 132 A1 describes an epicyclic gearbox suitable for wind power installations, whereby the shafts of the planet gears are provided with oil-carrying channels which are connected to the oil passage through the gearbox. As a result lubricating oil is forced in a flow direction through the planet gear bearings so that all the rows of rollers are supplied with sufficient lubricating oil for lubrication, even when there are a plurality of rows of bearings. The lubricating oil flowing through the bearings also flushes away from the bearings any wear particles that may be present as a result of bearing wear and the friction when teeth engage. The epicyclic gearbox has one planet stage, which in many cases is insufficient to transmit the torque.

It would therefore be desirable and advantageous to provide an improved epicyclic gearbox to obviate prior art shortcomings.

SUMMARY OF THE INVENTION

According to one aspect of the present invention, an epicyclic gearbox for a wind power installation includes a gearbox housing, a first planet stage revolving in the gearbox housing and having a planet support connected to a rotor of the wind power installation and having two side pieces, which are connected to one another by webs, and a plurality of planet gears having shafts and borne in the planet support through intervention of planet gear bearings, with the planet gears engaging a central sun gear shaft and a hollow gear which is firmly connected to the gearbox housing, an oil circulation system having an oil supply connected with an oil feed pump and constructed to extend through a wall of the gearbox housing, a first oil-carrying channel having one end connected to the oil inlet, and second oil-carrying channels constructed to extend through one of the side pieces of the planet support and connecting another end of the first oil-carrying channels to third and fourth oil-carrying channels of the oil circulation system which pass through the shafts of all the first planet gears and are open to the planet gear bearings of the first planet stage, a second planet stage including a second planet support, second planet gears borne in the second planet support though intervention of second planet gear bearings, and a second sun gear shaft, wherein the oil circulation system includes fifth oil-carrying channels which pass through the second planet support, and an insertion apparatus arranged firmly in the gearbox housing and including a radial stator with an axial bush which is arranged radially between the first planet support and the second planet support, wherein the first oil-carrying channel passes through the insertion apparatus, wherein the second oil-carrying channels extend within the one side piece of the first planet support from a first annular groove, which is formed in a radial end surface of the side piece and in the axial bush of the insertion apparatus, to a second annular groove at a contact surface between the first planet support and the shafts of the first planet gears, with the second annular groove being connected to the third and fourth oil-carrying channels within the shafts of all the first planet gears, wherein a third annular groove is formed in the axial bush and in a radial end surface of the second planet support, and wherein the fifth oil-carrying channels end in a fourth annular groove which is formed in a radial end surface of planet shafts of the second planet gears and connected to sixth and seventh oil-carrying channels which pass through the planet shafts of the second planet gears and are open toward the second planet gear bearings.

The present invention resolves prior art problems by complementing the first planet stage with a second planet stage which is integrated in the epicyclic gearbox and constructed to force lubricating oil to the planet gear bearings of the second planet stage. The two-stage epicyclic gearbox according to the invention uses only a single insertion apparatus which includes a stator with a bush and via which the planet gear bearings of both planet stages are supplied with lubricating oil at the same time and in parallel. As a result, the epicyclic gearbox is compact and simple in design. Since the supply of lubricating oil by means of an oil pump is always forced, the planet gear bearings are supplied with lubricating oil constantly and adequately even at low epicyclic gearbox rotation speeds. The planet supports and the plant gears may revolve at different rotation speeds.

According to another advantageous feature of the present invention, the third annular groove may be fluidly connected to the first oil-carrying channel within the bush of the insertion apparatus.

According to another advantageous feature of the present invention, the third annular groove may be connected to the fifth oil-carrying channels, each of the fifth oil-carrying channel including an axial section and an obliquely running section, and extending through the second planet support.

According to another advantageous feature of the present invention, the sixth oil-carrying channels may pass axially through the planet shafts of the second planet gears and can be open radially into the seventh oil-carrying channels which end open between the second planet gear bearings.

According to another advantageous feature of the present invention, the second oil-carrying channels of the first planet support and the third and fourth oil-carrying channels in the planet shafts of the first planet gears may form a connection for a first oil flow to the planet gear bearings of the first planet stage via the first annular groove in the bush of the insertion apparatus and in the side piece of the first planet support, and wherein the fifth oil-carrying channels in the second planet support and the sixth and seventh oil-carrying channels in the planet shaft of the second planet gears may form a connection for a second oil flow to the planet gear bearings of the second planet stage via the second annular groove in the bush of the insertion apparatus and in a hollow-cylindrical end section of the second planet support.

BRIEF DESCRIPTION OF THE DRAWING

Other features and advantages of the present invention will be more readily apparent upon reading the following descrip

DETAILED DESCRIPTION OF PREFERRED EMBODIMENTS

Figure 1:
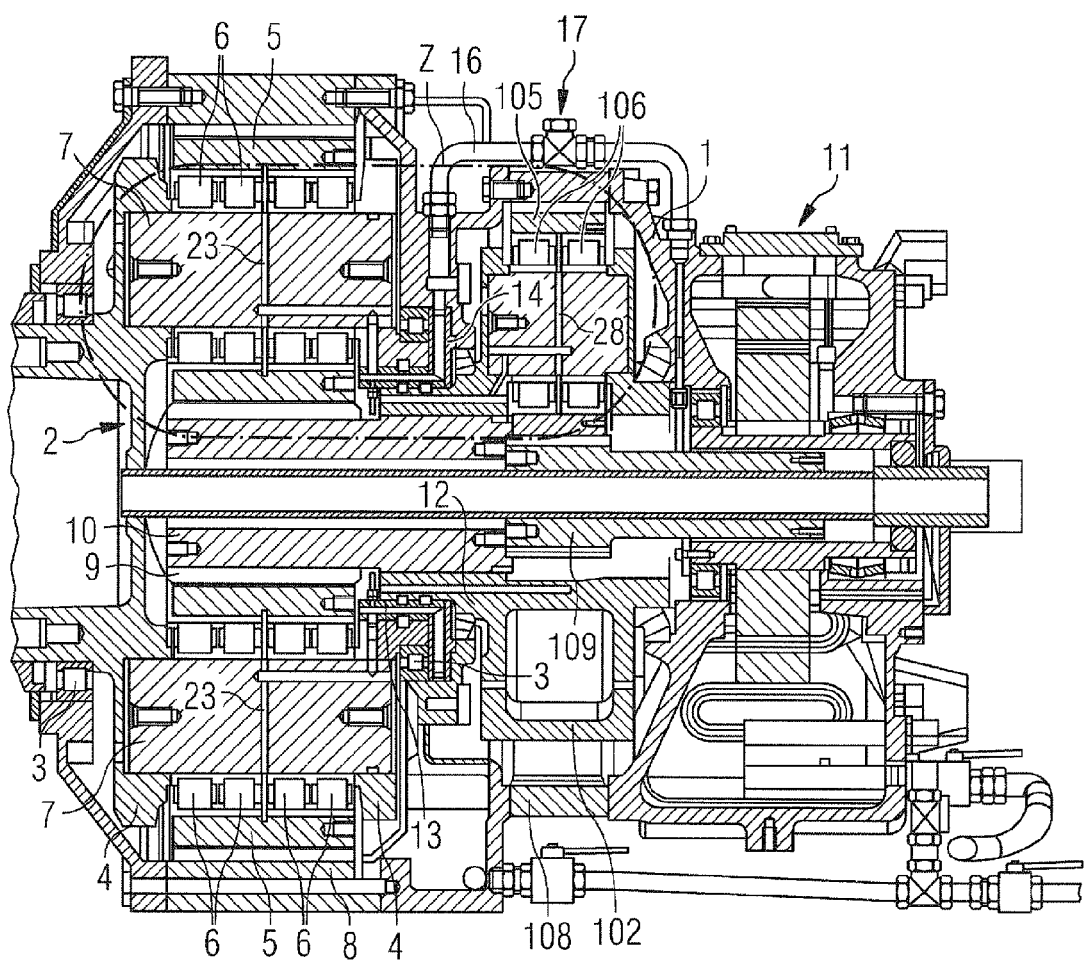
- FIG. 1 is a longitudinal section through a two-stage epicyclic gearbox according to the present invention.
Figure 2:
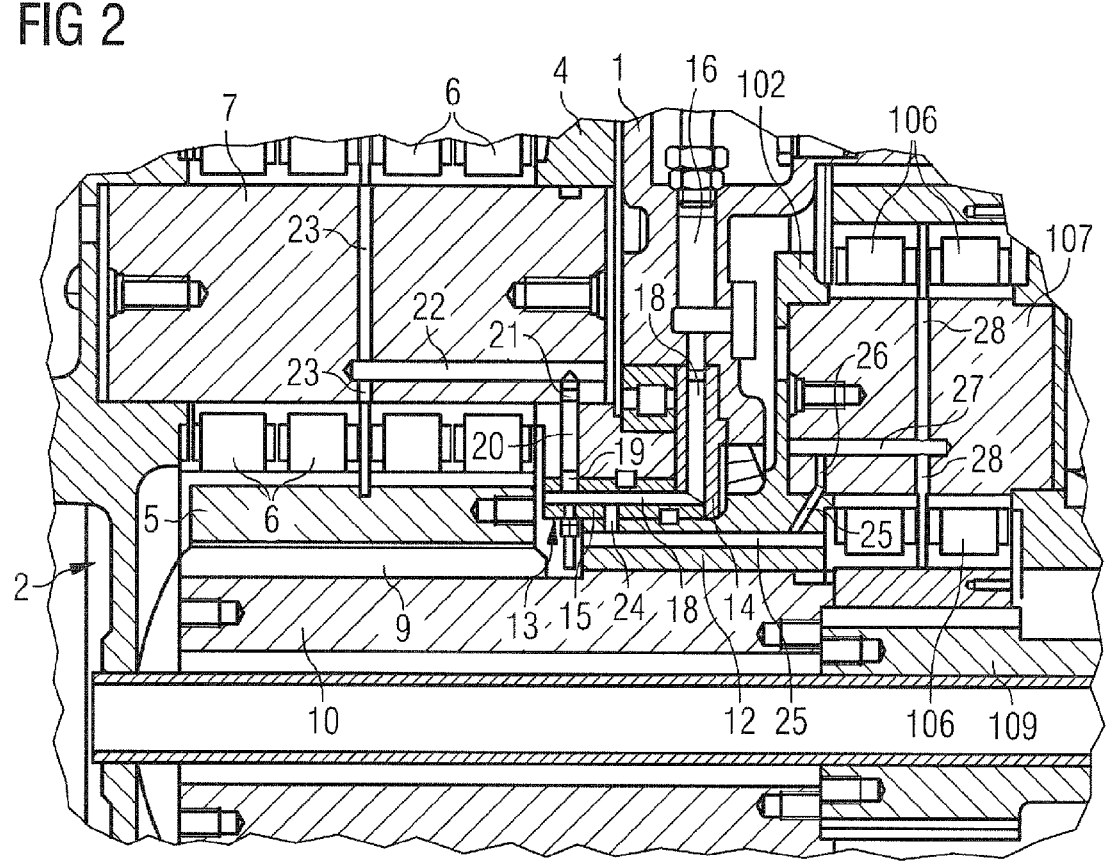
FIG. 2 is an enlarged detailed view of the area Z encircled in FIG. 1.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a longitudinal section through a two-stage epicyclic gearbox according to the present invention for arrangement on the tower of a wind power installation, which is not shown, and is used to drive a generator by means of a rotor that is fitted with blades. The gearbox is accommodated in a gearbox housing 1 and comprises a first plant stage, which is driven by the rotor. The first planet stage of the gearbox comprises a planet support 2 which is connected to the rotor shaft of the rotor, which is not shown. The planet support 2 is borne in bearings 3 in the gearbox housing 1 such that it can rotate and comprises two parallel side pieces 4, which are connected to one another by means of webs which are not shown.

A plurality of planet gears 5 are borne in planet gear bearings 6 in the planet support 2 such that they can rotate. The planet gear bearings 6, which are either in the form of single-row roller bearings or two-row roller bearings, and are arranged in the planet gear 5, are supported on the planet support 2 via a planet shaft 7. The planet gears 5 on the one hand engage with a hollow gear 8, which is arranged fixed to the gearbox housing 1, and on the other hand engage with a toothed rim 9, which is used as a central sun gear and is mounted on a sun gear shaft 10. The sun gear shaft 10 drives the generator of the wind power installation by means of a second planet stage and a spur gearbox stage 11.

The second planet stage comprises a second sun gear shaft 109 which engages with a plurality of second planet gears 105, which themselves engage in a second hollow gear 108 which is arranged fixed to the gearbox housing 1. The second planet gears 105 are borne via second planet gear bearings 106 in a second planet support 102 and are each supported via a second plant shaft 107 in the second planet support 102. The second planet support 102 has a hollow-cylindrical end section 12, which surrounds the sun gear shaft 10 and is surrounded by the planet support 2 of the first planet stage.

An insertion apparatus, generally designated by reference numeral 13, includes a stator 14 with a bush 15 and is inserted in a fixed manner in the gearbox housing 1. The stator 14 with the bush 15 is L-shaped and has a radial limb, the stator 14 and an axial limb, the bush 15 composed of a noble metal such as bronze. The axial bush 15 is located radially between the planet support 2 of the first planet stage and the hollow-cylindrical end section 12 of the planet support 102 of the second planet stage. A radial gap with a defined narrow gap width and a defined gap length is in each case incorporated between the bush 15 and the planet support 2 of the first planet stage, and between the bush 15 and the hollow-cylindrical end section 12 of the planet support 102 of the second planet stage. The gaps ensure that the bush 15 cannot carry out a bearing function for the planet supports 2, 102.

An oil feed pump is connected to the gearbox housing 1 via an externally laid oil line 16, sucks up lubricating oil from the oil sump which is located in the gearbox housing 1, and feeds the lubricating oil back under pressure into the gearbox housing 1, after filtration and possibly after cooling. The oil line 16 is connected to an oil supply 17 which is passed through the gearbox housing 1 as a hole coaxially with respect to the radial stator 14.

The oil supply 17 is connected to a first oil-carrying channel 18, which is passed as a hole through the radial stator 14 and the axial bush 15. The first oil-carrying channel 18 ends in a first annular groove 19, which is cut into the one side piece 4 of the planet support 2 at the boundary surface between the axial bush 15 and a radial end surface of this side piece 4.

The first annular groove 19 is connected to the second oil-carrying channels 20, which pass through the one side piece 4 of the planet support 2 as far as the shafts 7 of the planet gears 5. The number of second oil-carrying channels 20 in the planet support 2 corresponds to the number of planet gears 5. Each of the second oil-carrying channels 20 in the planet support 2 continues into a second annular groove 21, which is cut into each of the shafts 7 of the planet gears 5. The second annular groove 21 in the shaft 7 is connected to axial third oil-carrying channels 22, which pass through the shaft 7. The axial third oil-carrying channels 22 open into radial fourth oil-carrying channels 23, which end open between the two two-row planet gear bearings 6.

A third annular groove 24 is cut into the bush 15 at the boundary surfaces between the bush 15 and the hollow-cylindrical end section 12 of the second planet support 102, and has a connection to the first oil-carrying channel 18. The third annular groove 24 preferably continues into an annular groove which is cut into the hollow-cylindrical end section 12 of the second planet support 102. The third annular groove 24 is connected to fifth oil-carrying channels 25, which each comprise an axial section and an obliquely running section, and are passed through the second planet support 102. The number of fifth oil-carrying channels 25 in the second planet support 102 corresponds to the number of second planet gears 105. Every fifth oil-carrying channel 25 in the planet support 102 opens into a fourth annular groove 26, which is cut into each of the shafts 107 of the planet gears 105. The fourth annular groove 26 in the respective shaft 107 is connected to axial sixth oil-carrying channels 27, which pass through the respective shaft 107. The sixth oil-carrying channels 27 open into radial seventh oil-carrying channels 28, which end open between the second planet gear bearings 106.

The oil feed pump feeds a defined amount of lubricating oil, via the oil supply 17 in the wall of the gearbox housing 1, into the first oil-carrying channel 18 within the bush 15. A first oil flow passes via the first annular groove 19 in the bush 15 and in the side piece 4 of the planet support 2, the second oil-carrying channels 20 in the planet support 2 and the third and fourth oil-carrying channels 22, 23 in the shafts 7 of the planet gears 5 to the planet gear bearings 6 of the first planet stage. A second oil flow is passed to the planet gear bearings 106 of the second planet stage via the third annular groove 24 in the bush 15 and in the hollow-cylindrical end section 12 of the planet support 102, the fifth oil-carrying channels 25 in the planet support 102 and the sixth and seventh oil-carrying channels 27, 28 in the planet shaft 107. The planet bearings 6, 106 of the two planet stages are therefore positively and continuously supplied with a predetermined amount of lubricating oil via a single stator 14, at the same time. A positive supply of lubricating oil flows continuously through the planet gear bearings 6, 106, thus lubricating and flushing the planet gear bearings at the same time. The lubricating oil emerging from the planet gear bearings 6, 106 is collected in the oil sump at the bottom of the gearbox housing 1. The oil feed pump sucks the lubricating oil up from the oil sump, filters it, and, possibly after cooling, feeds it back into the gearbox.

The gaps between the bush 15 and the first planet support 2 as well as between the bush 15 and the hollow-cylindrical end section 12 of the second planet support 102, which have a defined gap width and a defined gap length, allow the lubricating oil for the planet gear bearings 6, 106 to be transported between the rotating planet supports 2, 102 and the non-rotating gearbox housing 1. Depending on the gap width, the gap length and the viscosity and the applied pressure of the lubricating oil in the first and third annular grooves 19, 24, only a small percentage of the amount of oil that is fed will leak into the oil sump, and this percentage can be calculated.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An epicyclic gearbox for a wind power installation, comprising:
   a gearbox housing;
   a first planet stage revolving in the gearbox housing and having a planet support connected to a rotor of the wind power installation and having two side pieces, which are connected to one another by webs, and a plurality of planet gears having shafts and borne in the planet support through intervention of planet gear bearings, said planet gears engaging a central sun gear shaft and a hollow gear which is firmly connected to the gearbox housing;
   an oil circulation system having an oil supply connected with an oil feed pump and constructed to extend through a wall of the gearbox housing, a first oil-carrying channel having one end connected to the oil inlet, and second oil-carrying channels constructed to extend through one of the side pieces of the planet support and connecting another end of the first oil-carrying channels to third and fourth oil-carrying channels of the oil circulation system which pass through the shafts of all the first planet gears and are open to the planet gear bearings of the first planet stage;
   a second planet stage including a second planet support, second planet gears borne in the second planet support though intervention of second planet gear bearings, and a second sun gear shaft, wherein the oil circulation system includes fifth oil-carrying channels which pass through the second planet support; and
   an insertion apparatus arranged firmly in the gearbox housing and including a radial stator with an axial bush which is arranged radially between the first planet support and the second planet support,
   wherein the first oil-carrying channel passes through the insertion apparatus,
   wherein the second oil-carrying channels extend within the one side piece of the first planet support from a first annular groove, which is formed in a radial end surface of the side piece and in the axial bush of the insertion apparatus, to a second annular groove at a contact surface between the first planet support and the shafts of the first planet gears, with the second annular groove being connected to the third and fourth oil-carrying channels within the shafts of all the first planet gears,
   wherein a third annular groove is formed in the axial bush and in a radial end surface of the second planet support, and
   wherein the fifth oil-carrying channels end in a fourth annular groove which is formed in a radial end surface of planet shafts of the second planet gears and connected to sixth and seventh oil-carrying channels which pass through the planet shafts of the second planet gears and are open toward the second planet gear bearings.

2. The epicyclic gearbox of claim 1, wherein the third annular groove is fluidly connected to the first oil-carrying channel within the bush of the insertion apparatus.

3. The epicyclic gearbox of claim 1, wherein the third annular groove is connected to the fifth oil-carrying channels, each said fifth oil-carrying channel comprising an axial section and an obliquely running section, and extending through the second planet support.

4. The epicyclic gearbox of claim 1, wherein the sixth oil-carrying channels pass axially through the planet shafts of the second planet gears and open radially into the seventh oil-carrying channels which end open between the second planet gear bearings.

5. The epicyclic gearbox of claim 1, wherein the second oil-carrying channels of the first planet support and the third and fourth oil-carrying channels in the planet shafts of the first planet gears form a connection for a first oil flow to the planet gear bearings of the first planet stage via the first annular groove in the bush of the insertion apparatus and in the side piece of the first planet support, and wherein the fifth oil-carrying channels in the second planet support and the sixth and seventh oil-carrying channels in the planet shaft of the second planet gears form a connection for a second oil flow to the planet gear bearings of the second planet stage via the second annular groove in the bush of the insertion apparatus and in a hollow-cylindrical end section of the second planet support.

* * * * *